United States Patent
Sun et al.

(10) Patent No.: US 10,091,682 B2
(45) Date of Patent: Oct. 2, 2018

(54) UPLINK AIRTIME FAIRNESS THROUGH BASIC SERVICE SET STEERING

(71) Applicant: QUALCOMM Incorporated, San Diego, CA (US)

(72) Inventors: Yanjun Sun, San Diego, CA (US); Peerapol Tinnakornsrisuphap, San Diego, CA (US); Brian Michael Buesker, San Diego, CA (US); Saiyiu Duncan Ho, San Diego, CA (US); Bharat Bhushan Chakravarty, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 15/218,730

(22) Filed: Jul. 25, 2016

(65) Prior Publication Data
US 2018/0027440 A1    Jan. 25, 2018

(51) Int. Cl.
| | |
|---|---|
| H04W 84/12 | (2009.01) |
| H04W 28/02 | (2009.01) |
| H04L 12/823 | (2013.01) |
| H04L 29/12 | (2006.01) |
| H04L 29/06 | (2006.01) |
| H04W 36/22 | (2009.01) |
| H04W 74/08 | (2009.01) |

(52) U.S. Cl.
CPC ......... *H04W 28/0215* (2013.01); *H04L 47/32* (2013.01); *H04L 61/1541* (2013.01); *H04L 63/0876* (2013.01); *H04W 36/22* (2013.01); *H04W 74/0816* (2013.01)

(58) Field of Classification Search
CPC . H04W 28/0215; H04W 28/02; H04W 84/12; H04L 47/32; H04L 61/1541; H04L 29/12
See application file for complete search history.

(56) References Cited

U.S. PATENT DOCUMENTS

| | | | |
|---|---|---|---|
| 9,736,718 B2 * | 8/2017 | Liu | H04W 28/0215 |
| 2006/0165103 A1 | 7/2006 | Trudeau et al. | |
| 2006/0271969 A1 * | 11/2006 | Takizawa | H04W 74/0808 725/81 |

(Continued)

FOREIGN PATENT DOCUMENTS

EP    191680 B1    12/2012

OTHER PUBLICATIONS

ISA/EP, International Search Report and Written Opinion of the International Searching Authority, Int'l Application No. PCT/US2017/037969, dated Oct. 9, 2017, European Patent Office, Rijswijk, NL, 16 pgs.

(Continued)

*Primary Examiner* — Andrew Lee
(74) *Attorney, Agent, or Firm* — Holland & Hart LLP

(57) ABSTRACT

Methods, systems, and devices for wireless communication are described. Methods, systems, and devices provide for determining or identifying a client device that is monopolizing a channel associated with a first basic service set (BSS). Once identified, a second BSS is dynamically created and configured with parameters that are throttled with respect to the first BSS. The client device is steered to the second BSS and is prevented from reassociating with the first BSS until a change in device status.

64 Claims, 9 Drawing Sheets

(56) References Cited

U.S. PATENT DOCUMENTS

| | | | |
|---|---|---|---|
| 2009/0279427 A1 | 11/2009 | Ji et al. | |
| 2012/0057532 A1* | 3/2012 | Qi | H04W 48/16 370/328 |
| 2012/0064896 A1* | 3/2012 | Guo | H04W 36/0066 455/436 |
| 2012/0224483 A1 | 9/2012 | Babiarz et al. | |
| 2012/0270593 A1* | 10/2012 | Park | H04W 52/343 455/522 |
| 2013/0107703 A1 | 5/2013 | Cherian et al. | |
| 2013/0183975 A1* | 7/2013 | Hyun | H04W 36/22 455/436 |
| 2014/0036893 A1 | 2/2014 | Bhanage et al. | |
| 2015/0029879 A1* | 1/2015 | Chou | H04W 76/02 370/252 |
| 2015/0358885 A1* | 12/2015 | Choi | H04W 36/22 455/438 |
| 2016/0020890 A1* | 1/2016 | Sirotkin | H04W 76/00 370/352 |
| 2016/0100399 A1 | 4/2016 | Kaushik et al. | |
| 2016/0183103 A1* | 6/2016 | Saily | H04W 36/02 370/216 |
| 2016/0295466 A1* | 10/2016 | da Silva | H04W 12/06 |
| 2017/0280337 A1* | 9/2017 | Bahr | H04W 24/02 |
| 2017/0289844 A1* | 10/2017 | Son | H04W 28/06 |

OTHER PUBLICATIONS

Zubow et al., "BIGAP—Seamless Handover in High Performance Enterprise IEEE 802.11 Networks," NOMS 2016, IEEE/IFIP Network Operations and Management Symposium, Apr. 25, 2016, pp. 445-453, XP032918134, DOI: 10.1109/NOMS.2016.7502842 [retrieved on Jun. 30, 2016], institute of Electrical and Electronics Engineers.

* cited by examiner

UPLINK AIRTIME FAIRNESS THROUGH BASIC SERVICE SET STEERING

BACKGROUND

The following relates generally to wireless communication, and more specifically to improving uplink airtime fairness through basic service set steering.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., IEEE 802.11) network may include an access point (AP) that may communicate with one or more stations (STAs) or mobile devices. The AP may be coupled to a network, such as the Internet, and may enable a STA to communicate via the network (or communicate with other devices coupled to the AP). A wireless device may communicate with a network device bi-directionally. For example, in a WLAN, a STA may communicate with an associated AP via downlink (DL) and uplink (UL). The DL (or forward link) may refer to the communication link from the AP to the STA, and the UL (or reverse link) may refer to the communication link from the STA to the AP.

Airtime Fairness (ATF) is a wireless communications system technique that may be used to improve system performance by managing the amount of airtime allocated for various STAs in a wireless communications system and may be employed by an AP used to limit DL transmissions. In wireless communications systems employing ATF, equal airtime may be allocated to each STA connected to an AP to limit the amount of airtime consumed by lower data rate STAs in order to provide additional airtime to higher data rate STAs.

While ATF efficiently manages airtime for DL transmissions, wireless communications systems employing ATF may not suitably handle situations in which a STA monopolizes or overloads a channel with data transmissions. In some cases, this may result in less overall airtime for high priority traffic (e.g., video streaming) and the quality of service (QoS) for the high priority traffic may degrade. This may also result in less airtime for high data rate (or higher priority) devices of the wireless communications system that are transmitting (or attempting to transmit) data packets, ultimately degrading the performance of the high data rate (or higher priority) devices.

SUMMARY

The described techniques relate to improved methods, systems, devices, or apparatuses that support improving uplink airtime fairness through basic service set (BSS) steering. Generally, the described techniques may be used to determine whether a first client device of a first BSS served by an access point (AP) is monopolizing (or overloading) uplink resources of the first BSS. For example, if a second client device of the first BSS is transmitting (or attempting to transmit) uplink packets, but is experiencing a low quality of service (QoS) due to the monopolization of uplink resources by the first client device, the first client device may be identified as greedy.

Once identified, the AP may dynamically create a second BSS (e.g., a virtual AP (VAP)) having a BSS identifier (BSSID) different from the BSSID of the first BSS. The second BSS may be configured with different parameters than the first BSS that throttle (i.e., limit) uplink traffic from devices connected to the second BSS. The first client device may then be steered to the second BSS (e.g., using BSS Transition Management) such that uplink traffic from the first client device is throttled by the second BSS. As a result, the previously overloaded uplink resources of the first BSS (overloaded by the first client device) may be freed up allowing for better performance (e.g., higher QoS) for high priority traffic or at high data rate devices.

A method of wireless communication is described. The method may include determining that a first client device is monopolizing a channel of a first BSS associated with a first BSSID and steering the first client device to a second BSS that is throttled with respect to the first BSS based at least in part on the determination, the second BSS associated with a second BSSID different from the first BSSID.

An apparatus for wireless communication is described. The apparatus may include means for determining that a first client device is monopolizing a channel of a first BSS associated with a first BSSID and means for steering the first client device to a second BSS that is throttled with respect to the first BSS based at least in part on the determination, the second BSS associated with a second BSSID different from the first BSSID.

Another apparatus for wireless communication is described. The apparatus may include a processor, memory in electronic communication with the processor, and instructions stored in the memory. The instructions may be operable to cause the processor to determine that a first client device is monopolizing a channel of a first BSS associated with a first BSSID and steer the first client device to a second BSS that is throttled with respect to the first BSS based at least in part on the determination, the second BSS associated with a second BSSID different from the first BSSID.

A non-transitory computer readable medium for wireless communication is described. The non-transitory computer-readable medium may include instructions operable to cause a processor to determine that a first client device is monopolizing a channel of a first BSS associated with a first BSSID and steer the first client device to a second BSS that is throttled with respect to the first BSS based at least in part on the determination, the second BSS associated with a second BSSID different from the first BSSID.

In some examples of the method, apparatus, and non-transitory computer-readable medium described above, determining that the first client device may be monopolizing the channel of the first BSS comprises: determining a performance degradation of a second client device connected to the first BSS.

In some examples of the method, apparatus, and non-transitory computer-readable medium described above, determining the performance degradation of the second client device connected to the first BSS comprises: determining an airtime usage of the channel by the first client device.

Some examples of the method, apparatus, and non-transitory computer-readable medium described above may further include processes, features, means, or instructions for increasing an enhanced distributed channel access (EDCA) deferral length for the first client device.

Some examples of the method, apparatus, and non-transitory computer-readable medium described above may further include processes, features, means, or instructions for reducing a transmission opportunity (TXOP) limit for the first client device.

Some examples of the method, apparatus, and non-transitory computer-readable medium described above may further include processes, features, means, or instructions for selectively withholding a transmission of a clear to send (CTS) message to the first client device.

Some examples of the method, apparatus, and non-transitory computer-readable medium described above may further include processes, features, means, or instructions for receiving a request to send (RTS) message from the first client device, the RTS message comprising a requested duration value. Some examples of the method, apparatus, and non-transitory computer-readable medium described above may further include processes, features, means, or instructions for selecting a duration field value that may be less than the requested duration value, the selecting based at least in part on the determination. Some examples of the method, apparatus, and non-transitory computer-readable medium described above may further include processes, features, means, or instructions for transmitting a CTS message to the first client device, the CTS message comprising the selected duration field value.

Some examples of the method, apparatus, and non-transitory computer-readable medium described above may further include processes, features, means, or instructions for dropping an uplink packet from the first client device above a media access control (MAC) layer.

Some examples of the method, apparatus, and non-transitory computer-readable medium described above may further include processes, features, means, or instructions for modifying an uplink Aggregate MAC Protocol Data Unit (A-MPDU) policy for the first client device.

Some examples of the method, apparatus, and non-transitory computer-readable medium described above may further include processes, features, means, or instructions for preventing the first client device from reassociating with the first BSS after steering the first client device to the second BSS.

In some examples of the method, apparatus, and non-transitory computer-readable medium described above, determining that the first client device may be monopolizing the channel of the first BSS comprises: determining that the first client device may be overloading an uplink channel associated with the first BSS.

In some examples of the method, apparatus, and non-transitory computer-readable medium described above, steering the first client device comprises: transmitting a dissociation message, a deauthentication message, or a BSS transition management frame to the first client device.

Some examples of the method, apparatus, and non-transitory computer-readable medium described above may further include processes, features, means, or instructions for creating the second BSS based at least in part on the determination that the first client device may be monopolizing the channel of the first BSS.

Some examples of the method, apparatus, and non-transitory computer-readable medium described above may further include processes, features, means, or instructions for terminating the second BSS based at least in part on a change in status of the first client device.

In some examples of the method, apparatus, and non-transitory computer-readable medium described above, the change in status comprises at least one of a change in association between the first client device and the first BSS or the second BSS, or a change in the determination that the first client device may be monopolizing the channel of the first BSS, or a change in association between a second client device and the first BSS, or a combination thereof.

Some examples of the method, apparatus, and non-transitory computer-readable medium described above may further include processes, features, means, or instructions for steering the first client device to the first BSS based at least in part on a termination of the second BSS, or a change in the determination that the first client device may be monopolizing the channel of the first BSS, or a change in association between a second client device and the first BSS, or a combination thereof.

In some examples of the method, apparatus, and non-transitory computer-readable medium described above, a service set identifier (SSID) and security credentials of the first BSS and the second BSS may be the same.

DETAILED DESCRIPTION

Figure 1:
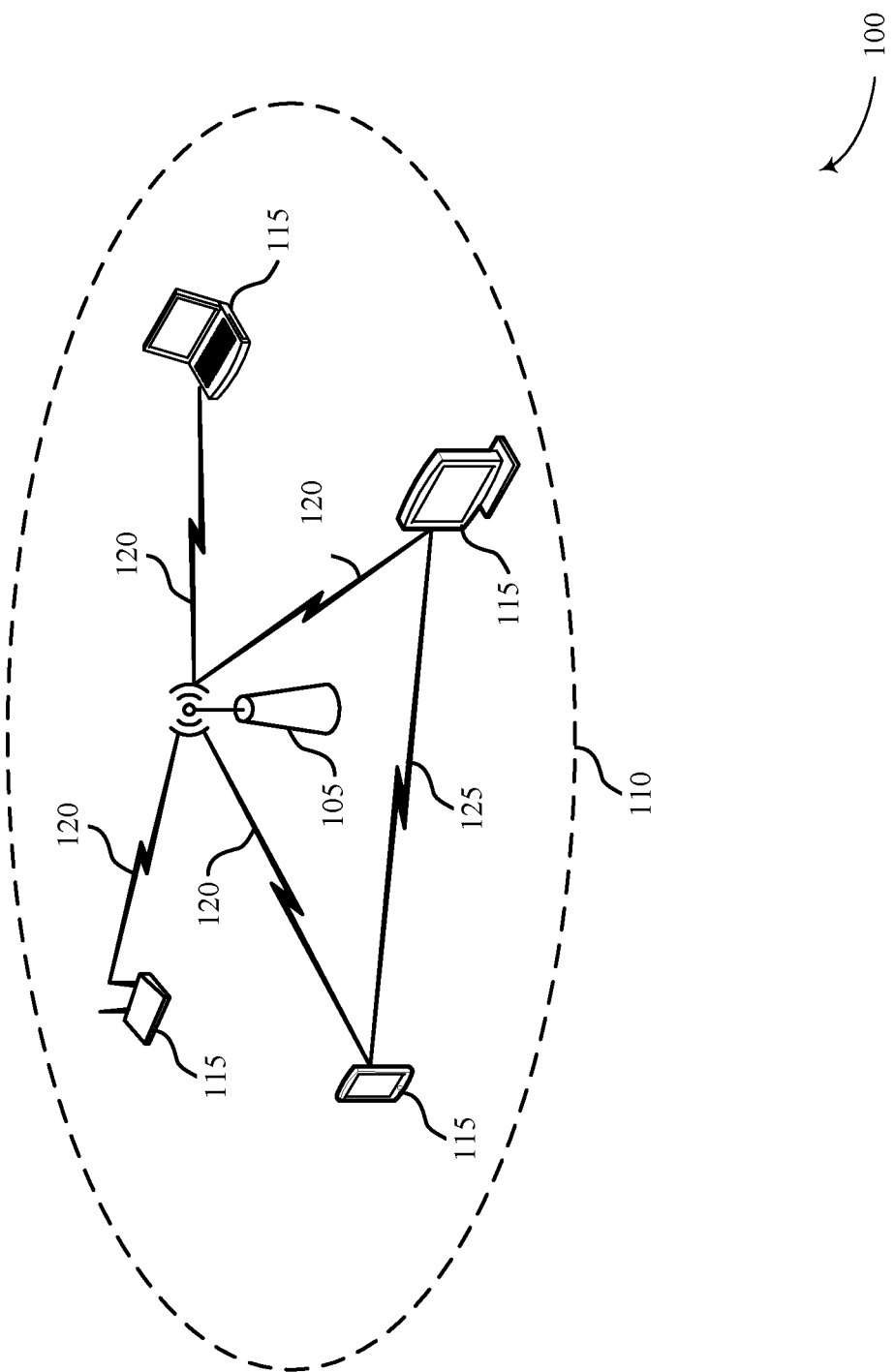
FIG. 1 illustrates an example of a system for wireless communication that supports improving uplink airtime fairness through basic service set steering in accordance with aspects of the present disclosure.

Wireless communications systems may employ various techniques for allocating resources (e.g., frequency, time, power, etc.) to various devices in the system. In some cases, an access point (AP) may transmit packets of the same size to each of a high data rate station (STA) and a low data rate STA (e.g., STAs communicating using a low modulation and coding scheme (MCS), STAs located at the edges of AP coverage areas, STAs with weak signal strength, or STAs devices with limited data rate capabilities, etc.). In such cases, the low data rate STA will take longer to successfully receive a packet compared to a high data rate STA because the low data rate STA is limited by how much data can be received in one second. As a result, if data packets of the same size are to be transmitted to each of a high data rate STA and a low data rate STA over the same medium, the low data rate STA will occupy the medium for a longer duration than the high data rate STA, and the quality of service (QoS) experienced by the high data rate device also connected to the AP may degrade.

Airtime Fairness (ATF) may be employed by an AP to manage the amount of airtime allocated for various STAs in the system by providing equal airtime to each STA connected to the AP. ATF may be used to limit the amount of airtime allocated for lower data rate STAs and provide additional airtime to higher data rate STAs in order to improve system performance. Although lower data rate STAs are allocated less airtime, the QoS remains relatively unchanged (i.e., an end user may not experience any noticeable difference in performance), while high data rate STAs may experience better QoS (i.e., an end user may experience higher performance).

While ATF may be used to efficiently manage airtime for downlink transmissions (from an AP to a STA), in some cases, a low data rate STA may monopolize (or overload) a channel with uplink transmissions. For example, a low data rate device may occupy a medium with uplink transmissions for a relatively long duration in order to transmit large and/or multiple uplink packets. This may result in less overall airtime for high priority uplink traffic (e.g., video streaming) or high data rate devices and the QoS for the high priority uplink traffic or the high data rate devices may degrade.

To improve overall system performance, a wireless communications system may be monitored in order to determine or identify a STA monopolizing or overloading a channel of a BSS served by an AP. Once a greedy STA is identified, the AP may dynamically create a second BSS (e.g., a virtual AP (VAP)) with parameters that throttle (or limit) uplink traffic from devices connected to the second BSS. After creating the second BSS, the AP may steer the greedy STA to associate with the second BSS.

Aspects of the disclosure are initially described in the context of a wireless communication system. Aspects of the disclosure are further illustrated by and described with reference to apparatus diagrams, system diagrams, and flowcharts that relate to title of the application.

FIG. 1 illustrates a wireless local area network (WLAN) 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a BSS or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 120 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

In some examples, WLAN 100 may be monitored to determine whether a STA 115 is monopolizing a channel of the WLAN 100. If it is determined that an STA 115 is monopolizing a channel of the WLAN, the AP 105 of the WLAN 100 may dynamically create a second BSS (e.g., a VAP) which may be configured to limit uplink traffic from any STAs connected to the second BSS. The STA 115 that is monopolizing the channel of the WLAN 100 may then be steered to the second BSS to prevent performance degradation at other STAs 115 in the WLAN 100.

Figure 2:
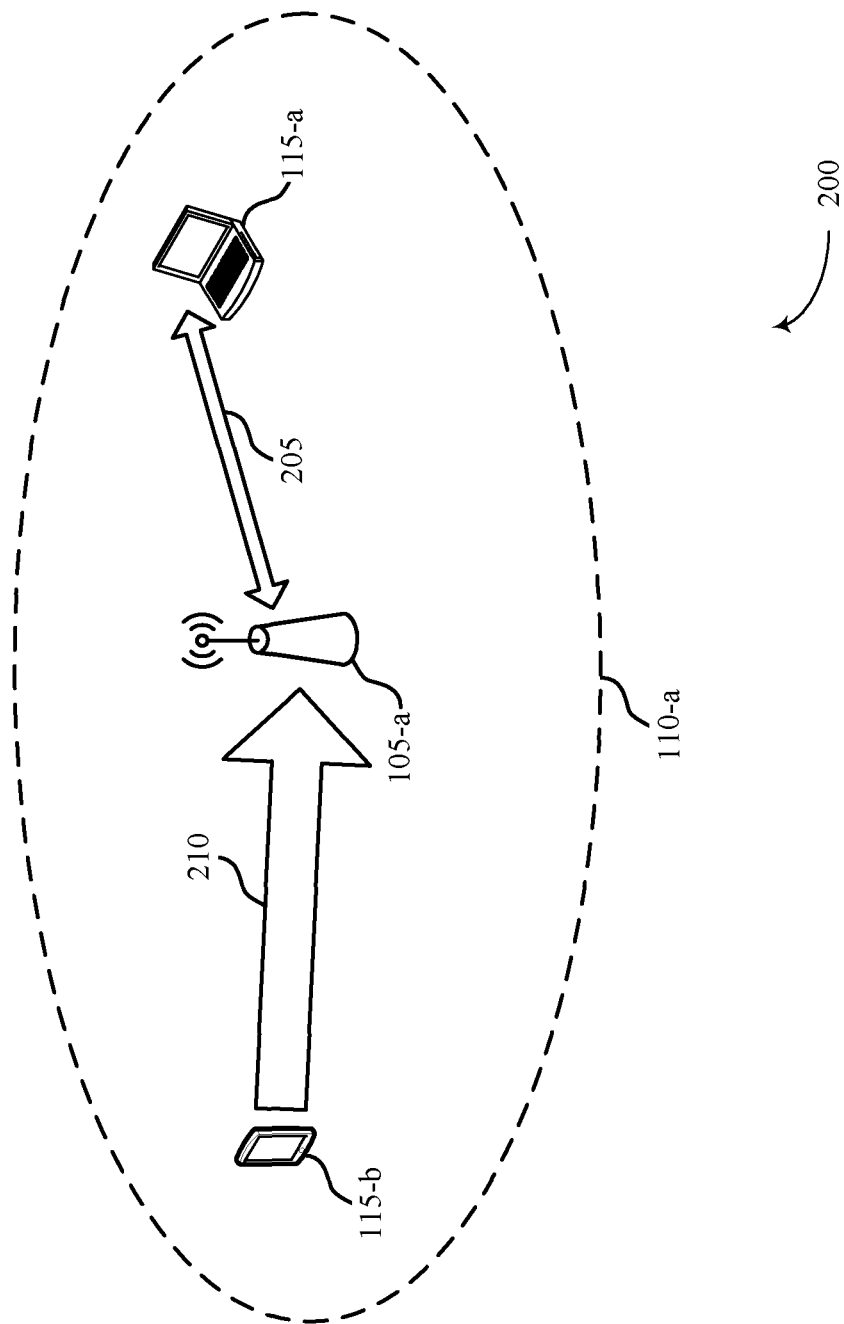
FIG. 2 illustrates an example of a system for wireless communication that supports improving uplink airtime fairness through basic service set steering in accordance with aspects of the present disclosure.

FIG. 2 illustrates an example of a wireless communication system 200 for improving uplink airtime fairness through BSS steering. In some cases, the wireless communication system 200 may represent aspects of techniques performed by a STA 115 or AP 105 as described with reference to FIG. 1. As shown in FIG. 2, the wireless communication system 200 includes a first BSS spanning coverage area 110-a. The first BSS is associated with AP 105-a and includes STA 115-a and STA 115-b. In FIG. 2, STA 115-a communicates with AP 105-a using channel 205 and STA 115-b communicates with AP 105-b using channel 210.

In some examples, the wireless communication system 200 is monitored in order to identify a client device (e.g., STA 115-a or STA 115-b) that is monopolizing or overloading a channel of the BSS. For example, AP 105-a may monitor channels 205 and 210 to determine whether STA 115-a or STA 115-b is overloading the first BSS with uplink transmissions. In another example, a network entity (e.g., a serving gateway or another node of the core network, not shown), monitors the first BSS including the AP 105-a as well as STAs 115-a and 115-b to determine if the first BSS is overloaded and cannot be offloaded to another BSS (e.g., a different BSS associated with a different AP in the wireless communication system 200). The identified client device may be referred to as a greedy client device or a greedy STA.

A greedy STA may be identified based on a number of factors. For example, a greedy STA may be identified based on an MCS associated with the greedy STA or whether the received signal strength indicator (RSSI) associated with the greedy STA crosses a threshold. In other examples, a greedy STA may be identified based on the number of bytes of uplink traffic transmitted or to be transmitted by the greedy STA or the amount of time a greedy STA occupies a channel (e.g., if the greedy STA exceeds a threshold amount of time or if the greedy STA occupies a medium for N times longer than its fair share), among others. Other indicators such as channel quality information (CQI) feedback or interference parameters associated with a greedy STA may be used in the identification of a greedy STA.

In some examples, channel 205 and channel 210 may be the same channel, may be different channels, or may be overlapping channels. As shown in the example of FIG. 2, STA 115-b is consuming a relatively large amount of airtime over channel 210. For example, STA 115-b may be transmitting a large packet or may be transmitting multiple packets over channel 210. In another example, STA 115-b may be transmitting for a long duration (e.g., the STA 115-b may be transmitting a data packet using a low MCS which results in a long transmission time). Also as shown, STA 115-a is communicating bi-directionally with AP 105-a using channel 205. The large airtime transmission over channel 210 may cause a performance degradation at STA 115-a as the AP 105-a may be overloaded with transmissions from STA 115-b. This may result in a loss of packets transmitted from STA 115-a to AP 105-a or may result in slower transmission or reception times between STA 115-a and AP 105-a over channel 205. In this example, it may be determined that STA 115-b is monopolizing channel 210 or overloading the first BSS associated with AP 105-a leading to a low QoS experienced by STA 115-a.

Once a STA 115-b is identified as greedy, AP 105-a may create a second BSS (e.g., a VAP) having a BSSID different from the BSSID of the first BSS. The second BSS may have identical security credentials and the same SSID as the first BSS, but may be configured with parameters that are throttled with respect to the first BSS. After creating the second BSS, the greedy STA 115-b may be steered to associate with the second BSS and uplink transmissions from the greedy STA 115-b are throttled (due to the configuration of the second BSS) which prevents the greedy STA 115-b from degrading the QoS at STA 115-a in the wireless communication system 200.

Figure 3:
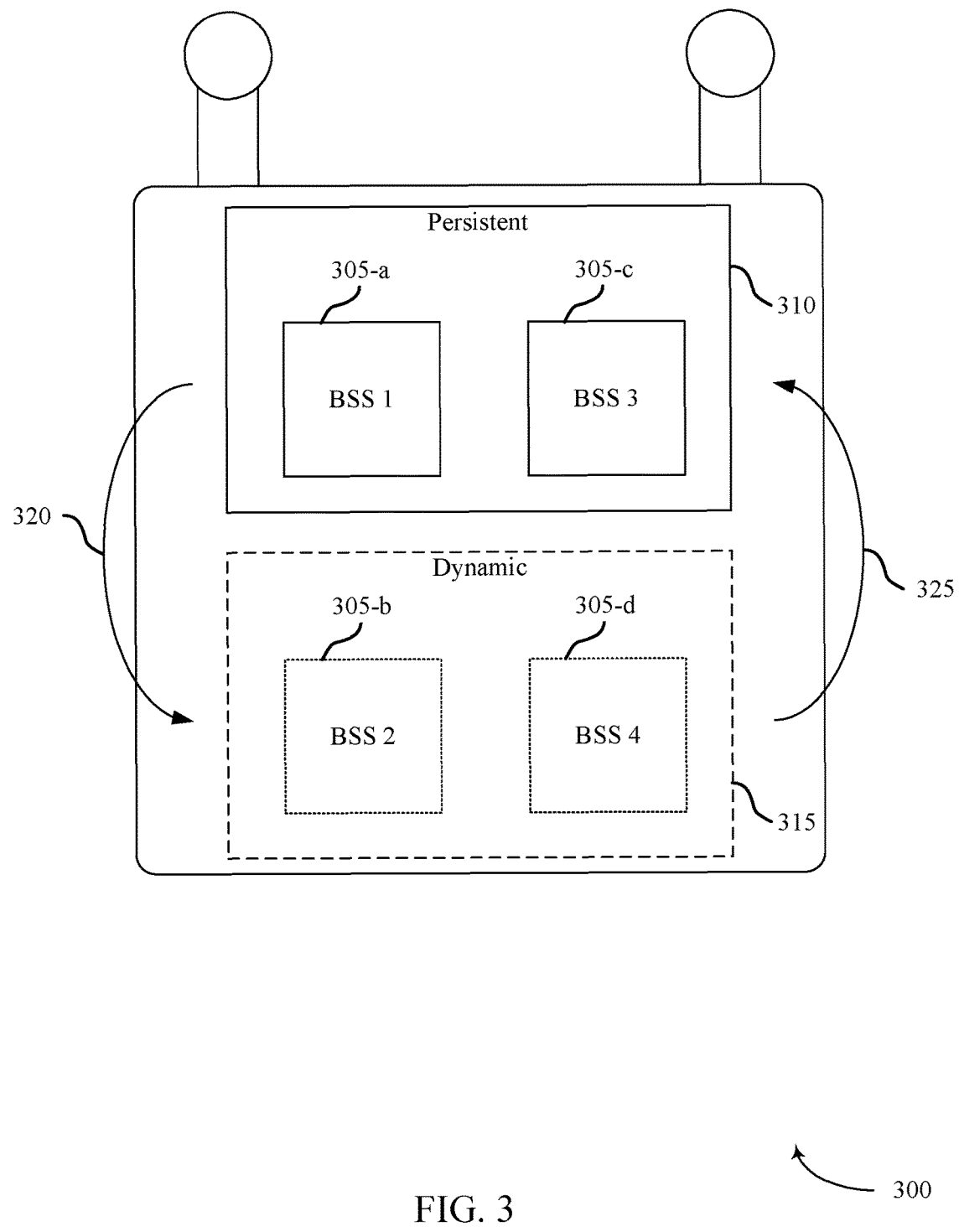
FIG. 3 illustrates an example of a system for wireless communication that supports improving uplink airtime fairness through basic service set steering in accordance with aspects of the present disclosure.

FIG. 3 illustrates an example of a wireless communication device 300 for improving uplink airtime fairness through BSS steering. In some cases, the wireless communication device 300 may represent aspects of techniques performed by an AP 105 (or other network entity) as described with reference to FIGS. 1 and 2.

In FIG. 3, wireless communication device 300 is capable of managing multiple BSSs 305. For example, wireless communication device 300 may be capable of managing a group of persistent BSSs 310 which includes BSS 305-a and 305-c. The persistent BSSs 310 may be associated with different frequency bands (e.g., BSS 305-a may support 2.4 gigahertz (GHz) communication and BSS 305-c may support 5 GHz communication) or may be associated with different security credentials (e.g., BSS 305-a may be an open network, while BSS 305-c may be a private network).

In some examples, the wireless communication device 300 may also be capable of managing a group of dynamically created BSSs 315 which includes BSS 305-b and BSS 305-d. Each of the dynamic BSSs 305-b and 305-d may correspond to a BSS within the group of persistent BSSs 310. For example, dynamic BSS 305-b may correspond with persistent BSS 305-a and dynamic BSS 305-d may correspond with persistent BSS 305-c. The dynamically created BSSs 315 may be created based on the identification of a greedy STA (e.g., greedy STA 115-b in FIG. 2). In some examples, the dynamically created BSS may share the same SSID and security credentials as its corresponding persistent BSS and may also be associated with the channel that was overloaded by a greedy STA.

The dynamically created BSSs 315 may include throttling parameters that are different from the parameters associated with the persistent BSSs 310. For example, BSS 305-b may be configured with larger Enhanced Distributed Channel Access (EDCA) deferrals or shorter Transmission Opportunities (TXOPs) compared to BSS 305-a. Further, BSS 305-b may also be configured to selectively withhold a clear to send (CTS) message for the STA, drop an uplink packet received from a STA, or modify an uplink Aggregate MAC Protocol Data Unit (A-MPDU) policy for the STA. Similarly, BSS 305-d may be configured with larger EDCA deferrals or shorter TXOPs compared to BSS 305-c. Further, BSS 305-d may also be configured to selectively withhold a CTS message for the STA, drop an uplink packet received from a STA, or modify an uplink A-MPDU policy for the STA.

In some examples, a STA that is associated with one of the persistent BSSs 305-a and 305-c may be identified as greedy. Once identified, the wireless communication device 300 may dynamically create a BSS corresponding with the persistent BSS being overloaded by the greedy STA, as indicated by arrow 320.

To steer the greedy STA, the wireless communication device 300 may utilize BSS Transition Management (BTM) or an enhanced base station algorithm and suggest an alternative BSS for the greedy STA. For example, if it is determined that a STA associated with BSS 305-a was monopolizing a channel of BSS 305-a, the wireless communication device 300 may suggest that the STA connect to the dynamic BSS 305-b corresponding to the BSS 305-a. The greedy STA may then associate with the BSS 305-b based on the suggestion. In other examples, the wireless communication device 300 may transmit a disassociation or de-authentication message to the greedy STA in order to terminate a connection between the greedy STA and BSS 305-a. In doing so, the greedy STA may then associate with dynamic BSS 305-b. In some examples, the wireless communication device 300 may steer the greedy STA to the dynamic BSS 305-b by choosing not respond to probe requests, association requests, or authentication requests. This may cause the greedy STA to cease its attempt to connect to BSS 305-a and instead connect to BSS 305-b.

Once connected to BSS 305-b, uplink transmissions from the greedy STA are throttled (due to the configuration of the BSS 305-b). This may prevent the greedy STA from degrading the QoS at other STAs connected to wireless communication device 300. For example, due to the configuration of the BSS 305-b, the greedy STA may need to wait longer to send uplink packets (larger EDCA deferrals). The greedy STA may also have to contend for access more often due to shorter TXOPs. In some cases, the BSS 305-b may selectively drop or limit the number of CTS messages generated or may drop uplink packets received from the greedy STA above a media access control (MAC) associated with the wireless communication device 300 (i.e., the BSS 305-b may receive an uplink packet from the greedy STA at the MAC layer, but not deliver the uplink packet to an upper layer). By steering the greedy STA to the dynamic BSS 305-b, this may prevent greedy STA from transmitting too often or too quickly.

In some examples, if the greedy STA no longer is identified as greedy, the BSS 305-b may be terminated, as indicated by arrow 325. For example, if the greedy STA disconnects from the wireless communication device 300 (e.g., due to loss of power), the dynamic BSS 305-*b* may be terminated. In other examples, if the greedy STA is no longer monopolizing uplink resources or if other STAs connected to the wireless communication device 300 disconnect from the wireless communication device 300, the BSS 305-*b* may be terminated and the STA may be steered to connect with BSS 305-*a*.

Figure 4:
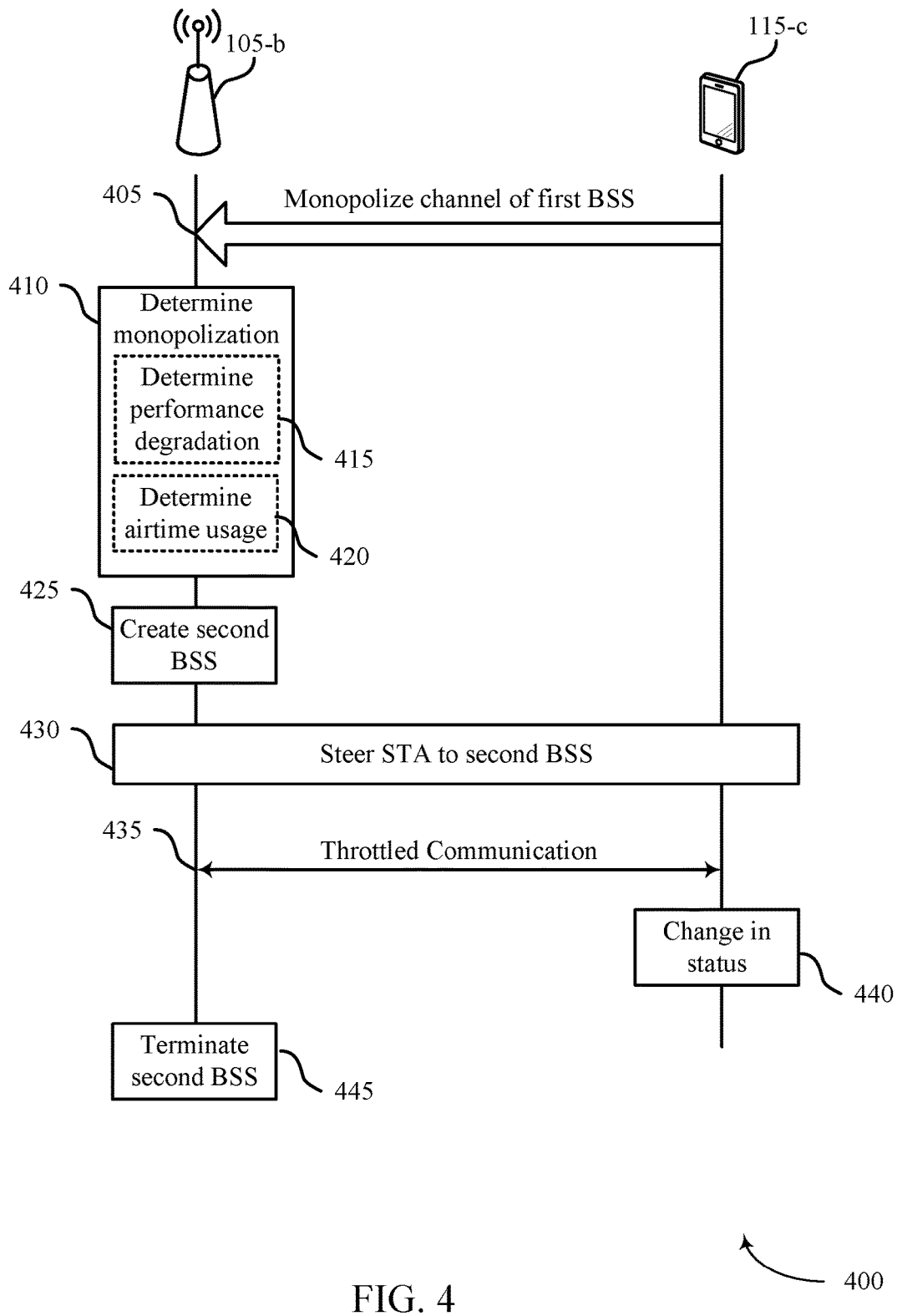
FIG. 4 illustrates an example of a process flow for improving uplink airtime fairness through basic service set steering in accordance with aspects of the present disclosure.

FIG. 4 illustrates an example of a process flow 400 for improving uplink airtime fairness through BSS steering. In some cases, process flow 400 may represent aspects of techniques performed by a STA 115 or AP 105 as described with reference to FIG. 1.

At point 405, STA 115-*c* may monopolize a channel of a first BSS associated with AP 105-*b*. In some examples, monopolizing may involve transmitting a large packet or multiple packets over an uplink channel of the first BSS. In other examples, the STA 115-*c* may be a low data rate device having a low MCS or located near an edge of a coverage area of the AP 105-*b*.

At block 410, the AP 105-*b* may determine that the STA 115-*c* is monopolizing a channel of the first BSS. In some examples, the AP 105-*b* may determine that the STA 115-*c* is monopolizing a channel of the first BSS by determining a performance degradation of another device connected to the AP 105-*b* at block 415. In other examples, the AP 105-*b* may determine that the airtime usage of the STA 115-*c* at block 420. For example, the AP 105-*b* may determine that the STA 115-*c* is utilizing more than a fair share of airtime compared to other devices connected to the AP 105-*b*. In some cases, determining airtime usage of the STA 115-*c* may include determining whether an airtime associated with the STA 115-*c* has surpassed a threshold or is N times greater than a fair share of airtime.

After it is determined that the STA 115-*c* is monopolizing the first BSS, the AP 105-*b* creates a second BSS at block 425. The second BSS may share the same SSID as the first BSS but may have a different BSSID compared to the first BSS. The second BSS may also be throttled with respect to the first BSS by being configured with larger EDCA deferrals or shorter TXOPs compared to the first BSS. Further, the second BSS may also be created to selectively withhold CTS messages, drop uplink packets, or have a modified A-MPDU policy. In some cases, the AP 105-*b* may select a duration field value for a CTS message for the first client device based on the determination at block 410, the selected duration field value may be less than a requested duration value of an RTS message from the first client device.

At block 430, the AP 105-*b* or other network entity may steer the STA 115-*c* to the second BSS created at block 425. Steering may include utilizing BTM or not responding to communications from the STA 115-*c*. Steering may also include preventing the STA 115-*c* from reassociating with the first BSS.

At throttled communication 435, the AP 105-*b* and STA 115-*c* may communicate using the second BSS. The communication may be throttled due to the configuration of the second BSS. This may allow for better performance or QoS at other devices connected to the AP 105-*b*.

In some examples, the STA 115-*c* may change status at block 440. For example, the STA 115-*c* may disassociate with the AP 105-*c* entirely. In other examples, a change in status may include a change in the determination that the STA 115-*c* is monopolizing the first BSS, or a device connected to the AP 105-*b* may no longer be associated with a low QoS.

Based on the change in status, the AP 105-*b* may then terminate the second BSS at block 445. In some examples, terminating the second BSS may include steering the STA 115-*c* to the first BSS.

Figure 5:
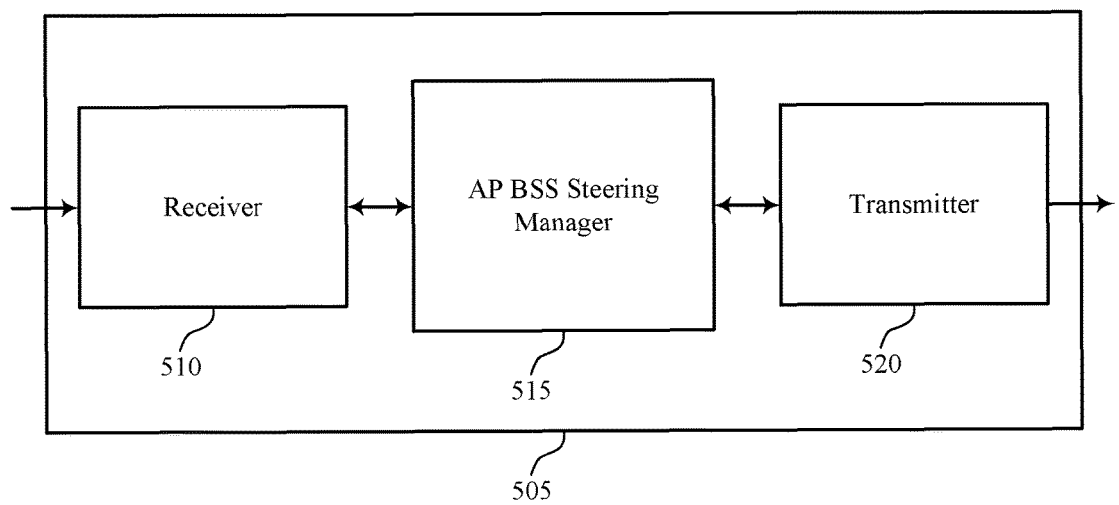
FIGS. 5 through 7 show block diagrams of a device that supports improving uplink airtime fairness through basic service set steering in accordance with aspects of the present disclosure.

FIG. 5 shows a block diagram 500 of a device 505 that supports improving uplink airtime fairness through BSS steering in accordance with various aspects of the present disclosure. Device 505 may be an example of aspects of an AP 105 as described with reference to FIGS. 1 and 2. Device 505 may include receiver 510, AP BSS steering manager 515, and transmitter 520. Device 505 may also include a processor. Each of these components may be in communication with one another (e.g., via one or more buses).

Receiver 510 may receive information such as packets, user data, or control information associated with various information channels (e.g., control channels, data channels, and information related to improving uplink airtime fairness through BSS steering, etc.). Information may be passed on to other components of the device. The receiver 510 may be an example of aspects of the transceiver 840 described with reference to FIG. 8.

AP BSS steering manager 515 may be an example of aspects of the AP BSS steering manager 815 described with reference to FIG. 8. AP BSS steering manager 515 may determine that a first client device is monopolizing a channel of a first BSS associated with a first BSSID and steer the first client device to a second BSS that is throttled with respect to the first BSS based on the determination, the second BSS associated with a second BSSID different from the first BSSID.

Transmitter 520 may transmit signals generated by other components of the device. In some examples, the transmitter 520 may be collocated with a receiver 510 in a transceiver module. For example, the transmitter 520 may be an example of aspects of the transceiver 840 described with reference to FIG. 8. The transmitter 520 may include a single antenna, or it may include a set of antennas.

Figure 6:
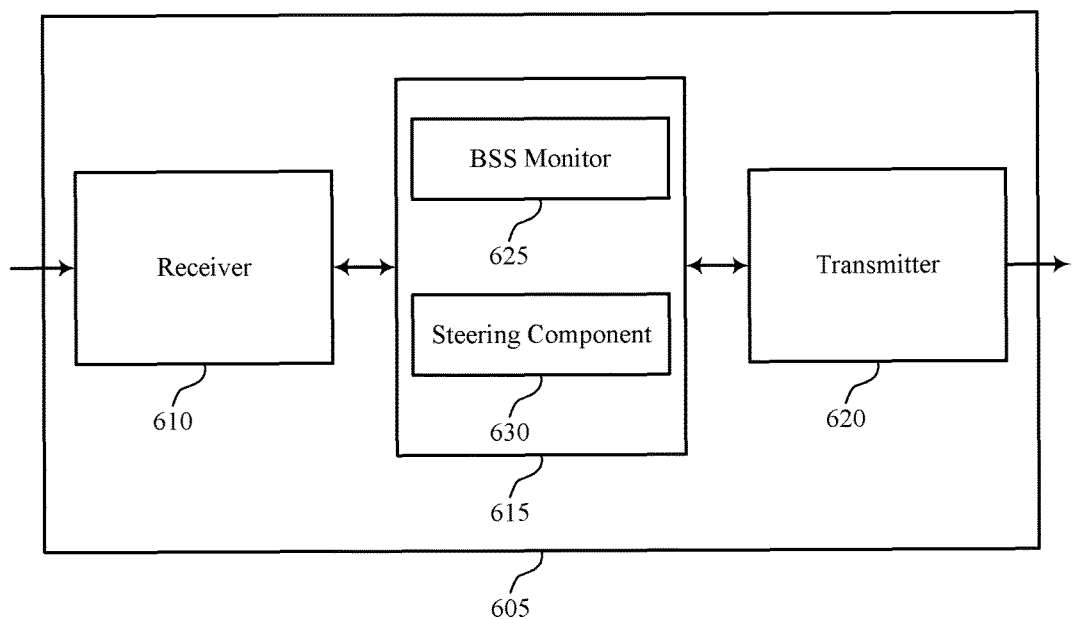

FIG. 6 shows a block diagram 600 of a device 605 that supports improving uplink airtime fairness through BSS steering in accordance with various aspects of the present disclosure. Device 605 may be an example of aspects of a device 505 or an AP 105 as described with reference to FIGS. 1, 2 and 5. Device 605 may include receiver 610, AP BSS steering manager 615, and transmitter 620. Device 605 may also include a processor. Each of these components may be in communication with one another (e.g., via one or more buses).

Receiver 610 may receive information such as packets, user data, or control information associated with various information channels (e.g., control channels, data channels, and information related to improving uplink airtime fairness through BSS steering, etc.). Information may be passed on to other components of the device. The receiver 610 may be an example of aspects of the transceiver 840 described with reference to FIG. 8.

AP BSS steering manager 615 may be an example of aspects of the AP BSS steering manager 815 described with reference to FIG. 8. AP BSS steering manager 615 may also include BSS monitor 625 and steering component 630.

BSS monitor 625 may determine that a first client device is monopolizing a channel of a first BSS associated with a first BSSID. In some cases, the change in status includes at least one of a change in association between the first client device and the first BSS or the second BSS, or a change in the determination that the first client device is monopolizing the channel of the first BSS, or a change in association between a second client device and the first BSS, or a combination thereof.

Steering component 630 may steer the first client device to a second BSS that is throttled with respect to the first BSS based on the determination, the second BSS associated with a second BSSID different from the first BSSID, increase an EDCA deferral length for the first client device, reduce a TXOP limit for the first client device, selectively withhold a transmission of a CTS message to the first client device, receive an RTS message that includes a requested duration value, select a duration field value that is less than the requested duration value for a CTS message based on the determination, transmit a CTS message that includes the selected duration field value, modify an uplink A-MPDU policy for the first client device, prevent the first client device from reassociating with the first BSS after steering the first client device to the second BSS, drop an uplink packet from the first client device above a MAC layer, and steer the first client device to the first BSS based on a termination of the second BSS, or a change in the determination that the first client device is monopolizing the channel of the first BSS, or a change in association between a second client device and the first BSS, or a combination thereof.

Transmitter 620 may transmit signals generated by other components of the device. In some examples, the transmitter 620 may be collocated with a receiver 610 in a transceiver module. For example, the transmitter 620 may be an example of aspects of the transceiver 840 described with reference to FIG. 8. The transmitter 620 may include a single antenna, or may include a set of antennas.

Figure 7:
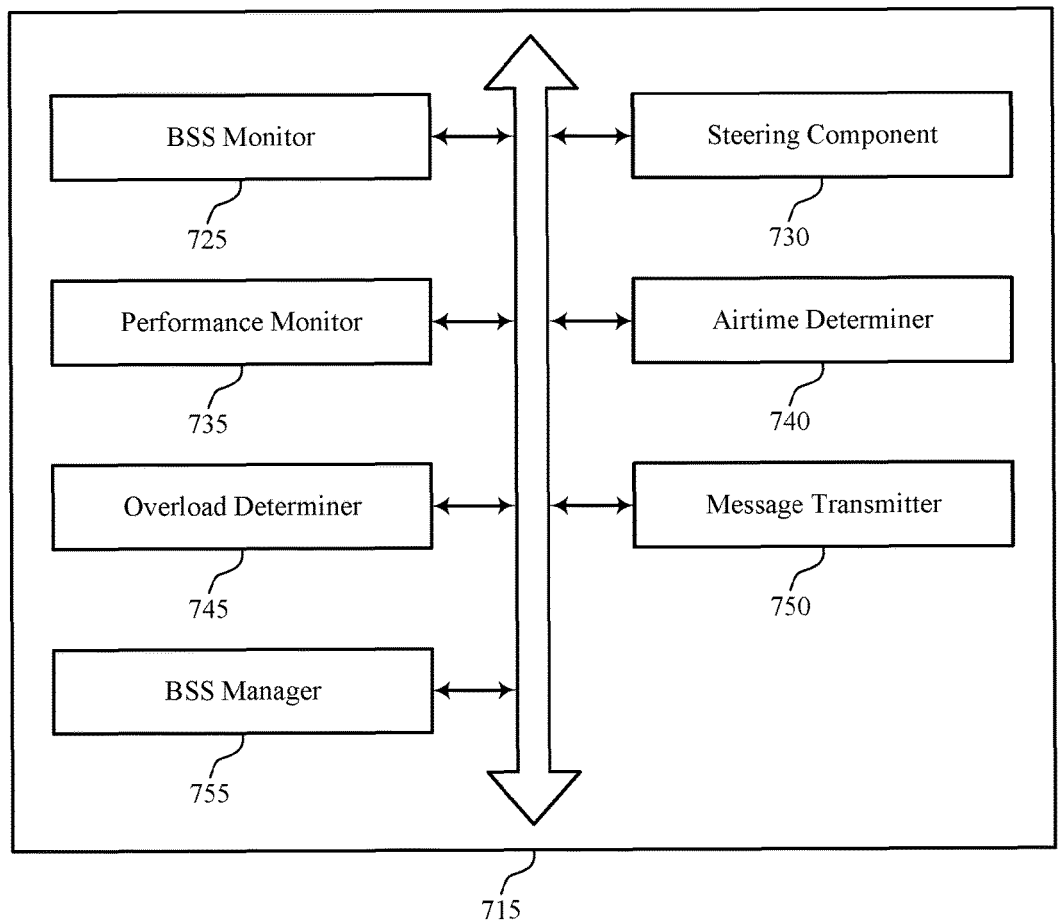

FIG. 7 shows a block diagram 700 of an AP BSS steering manager 715 that supports improving uplink airtime fairness through BSS steering in accordance with various aspects of the present disclosure. The AP BSS steering manager 715 may be an example of aspects of an AP BSS steering manager 515, an AP BSS steering manager 615, or an AP BSS steering manager 815 described with reference to FIGS. 5, 6, and 8. The AP BSS steering manager 715 may include BSS monitor 725 and steering component 730. Each of these modules may communicate, directly or indirectly, with one another (e.g., via one or more buses).

BSS monitor 725 may determine that a first client device is monopolizing a channel of a first BSS associated with a first BSSID. In some cases, the change in status includes at least one of a change in association between the first client device and the first BSS or the second BSS, or a change in the determination that the first client device is monopolizing the channel of the first BSS, or a change in association between a second client device and the first BSS, or a combination thereof.

Steering component 730 may steer the first client device to a second BSS that is throttled with respect to the first BSS based on the determination, the second BSS associated with a second BSSID different from the first BSSID, increase an EDCA deferral length for the first client device, reduce a TXOP limit for the first client device, selectively withhold a transmission of a CTS message to the first client device, receive an RTS message that includes a requested duration value, select a duration field value that is less than the requested duration value for a CTS message based on the determination, transmit a CTS message that includes the selected duration field value, modify an uplink A-MPDU policy for the first client device, prevent the first client device from reassociating with the first BSS after steering the first client device to the second BSS, drop an uplink packet from the first client device above a MAC layer, and steer the first client device to the first BSS based on a termination of the second BSS, or a change in the determination that the first client device is monopolizing the channel of the first BSS, or a change in association between a second client device and the first BSS, or a combination thereof.

Performance monitor 735 may monitor performance of one or more client devices in a wireless communications system. In some cases, determining that the first client device is monopolizing the channel of the first BSS includes: determining a performance degradation of a second client device connected to the first BSS.

Airtime determiner 740 may determine airtime usage for one or more client devices in a wireless communications system. In some cases, determining the performance degradation of the second client device connected to the first BSS includes: determining an airtime usage of the channel by the first client device.

Overload determiner 745 may determine whether one or more client devices in a wireless communications system are overloading the system. In some cases, determining that the first client device is monopolizing the channel of the first BSS includes: determining that the first client device is overloading an uplink channel associated with the first BSS that cannot be offloaded.

Message transmitter 750 may transmit messages to one or more client devices in a wireless communications system. In some cases, steering the first client device includes: transmitting a dissociation message, a deauthentication message, or a BSS transition management frame to the first client device.

BSS manager 755 may create the second BSS based on the determination that the first client device is monopolizing the channel of the first BSS and terminate the second BSS based on a change in status of the first client device. In some cases, the SSID and security credentials of the first BSS and the second BSS are the same.

Figure 8:
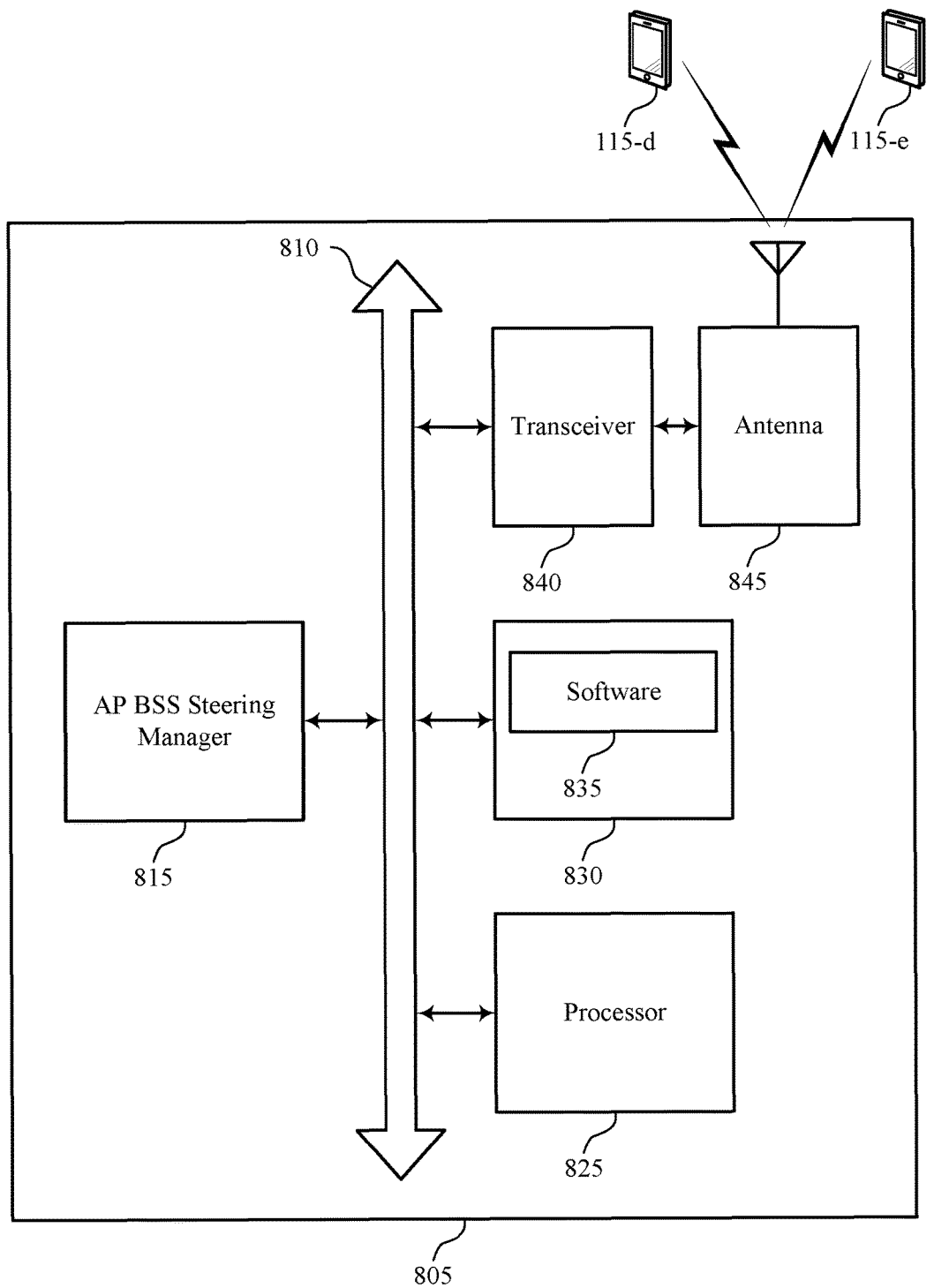
FIG. 8 illustrates a block diagram of a system including an AP that supports improving uplink airtime fairness through basic service set steering in accordance with aspects of the present disclosure.

FIG. 8 shows a diagram of a system 800 including a device 805 that supports improving uplink airtime fairness through BSS steering in accordance with various aspects of the present disclosure. Device 805 may be an example of a device 505, device 605, or an AP 105 as described above, e.g., with reference to FIGS. 1, 2, 5 and 6.

Device 805 may include components for bi-directional voice and data communications including components for transmitting and receiving communications, including AP BSS steering manager 815, processor 825, memory 830, software 835, transceiver 840, and antenna 845.

Processor 825 may include an intelligent hardware device, (e.g., a central processing unit (CPU), a microcontroller, an application specific integrated circuit (ASIC), etc.)

Memory 830 may include random access memory (RAM) and read only memory (ROM). The memory 830 may store computer-readable, computer-executable software 835 including instructions that, when executed, cause the processor to perform various functions described herein. In some cases, the memory 830 can contain, among other things, a Basic Input-Output system (BIOS) which may control basic hardware and/or software operation such as the interaction with peripheral components or devices.

Software 835 may include code to implement aspects of the present disclosure, including code to support improving uplink airtime fairness through BSS steering. Software 835 can be stored in a non-transitory computer-readable medium such as system memory or other memory. In some cases, the software 835 may not be directly executable by the processor but may cause a computer (e.g., when compiled and executed) to perform functions described herein.

Transceiver 840 may communicate bi-directionally, via one or more antennas, wired, or wireless links as described above. For example, the transceiver 840 may represent a wireless transceiver and may communicate bi-directionally with another wireless transceiver. The transceiver 840 may also include a modem to modulate the packets and provide the modulated packets to the antennas for transmission, and to demodulate packets received from the antennas.

In some cases, the wireless device may include a single antenna 845. However, in some cases the device 805 may have more than one antenna 845, which may be capable of concurrently transmitting or receiving multiple wireless transmissions or may be capable of communication with STAs 115-*d* and 115-*e*.

Figure 9:
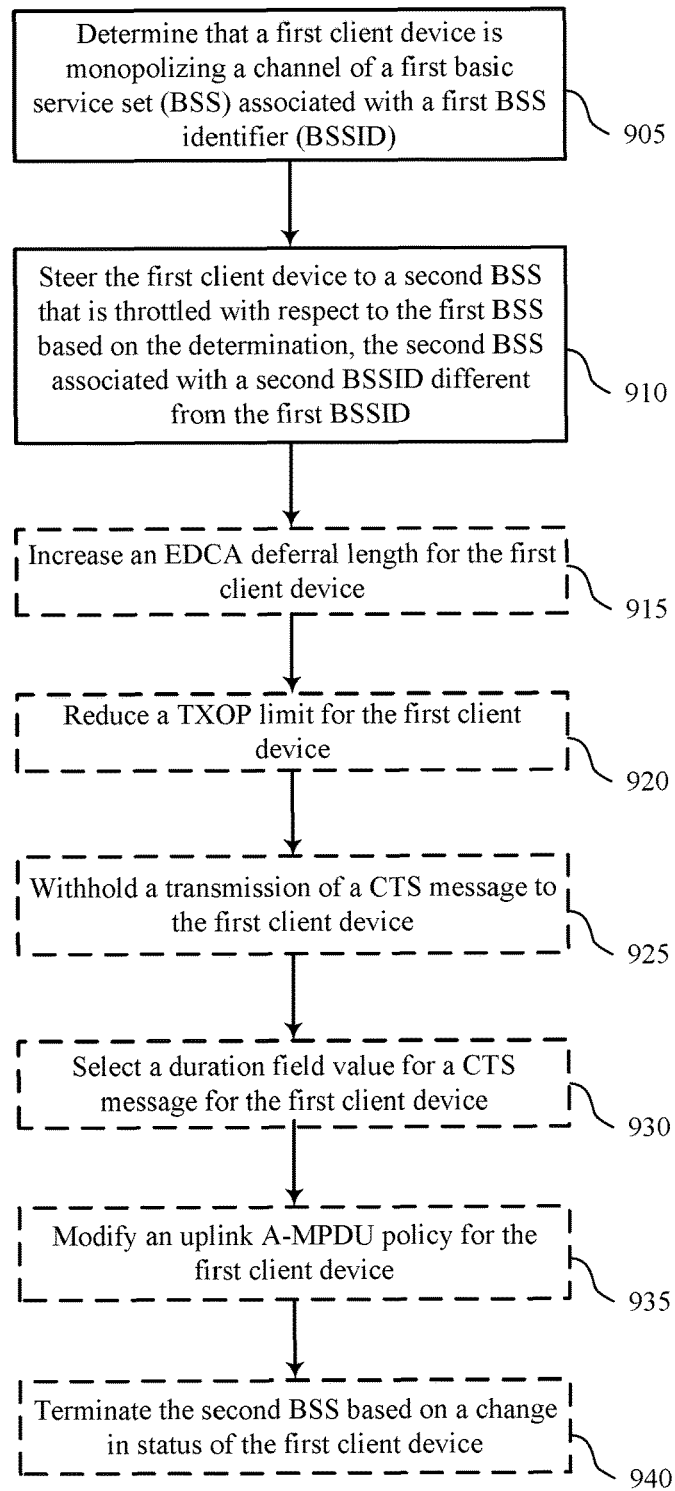
FIG. 9 illustrates methods for improving uplink airtime fairness through basic service set steering in accordance with aspects of the present disclosure.

FIG. 9 shows a flowchart illustrating a method 900 for improving uplink airtime fairness through BSS steering in accordance with various aspects of the present disclosure. The operations of method 900 may be implemented by an AP 105 or its components as described herein. For example, the operations of method 900 may be performed by an AP BSS steering manager as described with reference to FIGS. 5 through 7. In some examples, an AP 105 may execute a set of codes to control the functional elements of the device to perform the functions described below. Additionally or alternatively, the AP 105 may perform aspects the functions described below using special-purpose hardware.

At block 905, the AP 105 may determine that a first client device is monopolizing a channel of a first BSS associated with a first BSSID. The operations of block 905 may be performed according to the methods described with reference to FIGS. 2 through 4. In certain examples, aspects of the operations of block 905 may be performed by a BSS monitor as described with reference to FIGS. 5 through 7.

At block 910, the AP 105 may steer the first client device to a second BSS that is throttled with respect to the first BSS based on the determination, the second BSS associated with a second BSSID different from the first BSSID. The operations of block 910 may be performed according to the methods described with reference to FIGS. 2 through 4. In certain examples, aspects of the operations of block 910 may be performed by a steering component as described with reference to FIGS. 5 through 7.

Optionally, at block 915, the AP 105 may increase an EDCA deferral length for the first client device. The operations of block 915 may be performed according to the methods described with reference to FIGS. 2 through 4. In certain examples, aspects of the operations of block 915 may be performed by the BSS manager as described with reference to FIGS. 5 through 7.

Optionally, at block 920, the AP 105 may reduce a TXOP limit for the first client device. The operations of block 920 may be performed according to the methods described with reference to FIGS. 2 through 4. In certain examples, aspects of the operations of block 920 may be performed by the steering component as described with reference to FIGS. 5 through 7.

Optionally, at block 925, the AP 105 may selectively withhold transmission of a CTS message to the first client device. The operations of block 925 may be performed according to the methods described with reference to FIGS. 2 through 4. In certain examples, aspects of the operations of block 925 may be performed by the steering component as described with reference to FIGS. 5 through 7.

Optionally, at block 930, the AP 105 may select a duration field value for a CTS message to be transmitted to the first client device. In some cases, the duration field value may be less than a requested duration value of an RTS message from the first client device. The operations of block 930 may be performed according to the methods described with reference to FIGS. 2 through 4. In certain examples, aspects of the operations of block 930 may be performed by the steering component as described with reference to FIGS. 5 through 7.

Optionally, at block 935, the AP 105 may modify an uplink A-MPDU policy for the first client device. The operations of block 935 may be performed according to the methods described with reference to FIGS. 2 through 4. In certain examples, aspects of the operations of block 935 may be performed by the steering component as described with reference to FIGS. 5 through 7.

Optionally, at block 940, the AP 105 may terminate the second BSS based on a change in status of the first client device. The operations of block 940 may be performed according to the methods described with reference to FIGS. 2 through 4. In certain examples, aspects of the operations of block 940 may be performed by a BSS manager as described with reference to FIGS. 5 through 7.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The wireless communications system or systems described herein may support synchronous or asynchronous operation. For synchronous operation, the APs may have similar frame timing, and transmissions from different APs may be approximately aligned in time. For asynchronous operation, the APs may have different frame timing, and transmissions from different APs may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, WLAN 100 and wireless communication system 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
    determining that a first client device is monopolizing a channel of a first basic service set (BSS) associated with a first BSS identifier (BSSID);
    dynamically creating, based on the determining, a second BSS comprising a virtual AP, wherein the second BSS is throttled with respect to the first BSS; and
    steering the first client device to the second BSS, the second BSS associated with a second BSSID different from the first BSSID.

2. The method of claim 1, wherein determining that the first client device is monopolizing the channel of the first BSS comprises:
    determining a performance degradation of a second client device connected to the first BSS.

3. The method of claim 2, wherein determining the performance degradation of the second client device connected to the first BSS comprises:
    determining an airtime usage of the channel by the first client device.

4. The method of claim 1, further comprising:
    increasing an enhanced distributed channel access (EDCA) deferral length for the first client device.

5. The method of claim 1, further comprising:
    reducing a transmission opportunity (TXOP) limit for the first client device.

6. The method of claim 1, further comprising:
    selectively withholding a transmission of a clear to send (CTS) message to the first client device.

7. The method of claim 1, further comprising:
receiving a request to send (RTS) message from the first client device, the RTS message comprising a requested duration value;
selecting a duration field value that is less than the requested duration value, the selecting based on the determination; and
transmitting a clear to send (CTS) message to the first client device, the CTS message comprising the selected duration field value.

8. The method of claim 1, further comprising:
modifying an uplink Aggregate MAC Protocol Data Unit (A-MPDU) policy for the first client device.

9. The method of claim 1, further comprising:
preventing the first client device from reassociating with the first BSS after steering the first client device to the second BSS.

10. The method of claim 1, further comprising:
dropping an uplink packet from the first client device at a protocol layer higher than a media access control (MAC) protocol layer.

11. The method of claim 1, wherein determining that the first client device is monopolizing the channel of the first BSS comprises:
determining that the first client device is overloading an uplink channel associated with the first BSS.

12. The method of claim 1, wherein steering the first client device comprises:
transmitting a dissociation message, a deauthentication message, or a BSS transition management frame to the first client device.

13. The method of claim 1, further comprising:
terminating the second BSS based on a change in status of the first client device.

14. The method of claim 13, wherein the change in status comprises at least one of a change in association between the first client device and the first BSS or the second BSS, or a change in the determination that the first client device is monopolizing the channel of the first BSS, or a change in association between a second client device and the first BSS, or a combination thereof.

15. The method of claim 1, further comprising:
steering the first client device to the first BSS based on a termination of the second BSS, or a change in the determination that the first client device is monopolizing the channel of the first BSS, or a change in association between a second client device and the first BSS, or a combination thereof.

16. The method of claim 1, wherein a service set identifier (SSID) and security credentials of the first BSS and the second BSS are the same.

17. An apparatus for wireless communication, comprising:
means for determining that a first client device is monopolizing a channel of a first basic service set (BSS) associated with a first BSS identifier (BSSID);
means for dynamically creating, based on the determining, a second BSS comprising a virtual AP, wherein the second BSS is throttled with respect to the first BSS; and
means for steering the first client device to the second BSS, the second BSS associated with a second BSSID different from the first BSSID.

18. The apparatus of claim 17, wherein the means for determining that the first client device is monopolizing the channel of the first BSS comprises:
means for determining a performance degradation of a second client device connected to the first BSS.

19. The apparatus of claim 18, wherein the means for determining the performance degradation of the second client device connected to the first BSS comprises:
means for determining an airtime usage of the channel by the first client device.

20. The apparatus of claim 17, further comprising:
means for increasing an enhanced distributed channel access (EDCA) deferral length for the first client device.

21. The apparatus of claim 17, further comprising:
means for reducing a transmission opportunity (TXOP) limit for the first client device.

22. The apparatus of claim 17, further comprising:
means for selectively withholding a transmission of a clear to send (CTS) message to the first client device.

23. The apparatus of claim 17, further comprising:
means for receiving a request to send (RTS) message from the first client device, the RTS message comprising a requested duration value;
means for selecting a duration field value that is less than the requested duration value, the selecting based on the determination; and
means for transmitting a clear to send (CTS) message to the first client device, the CTS message comprising the selected duration field value.

24. The apparatus of claim 17, further comprising:
means for modifying an uplink Aggregate MAC Protocol Data Unit (A-MPDU) policy for the first client device.

25. The apparatus of claim 17, further comprising:
means for preventing the first client device from reassociating with the first BSS after steering the first client device to the second BSS.

26. The apparatus of claim 17, further comprising:
means for dropping an uplink packet from the first client device at a protocol layer higher than a media access control (MAC) protocol layer.

27. The apparatus of claim 17, wherein the means for determining that the first client device is monopolizing the channel of the first BSS comprises:
means for determining that the first client device is overloading an uplink channel associated with the first BSS.

28. The apparatus of claim 17, wherein the means for steering the first client device comprises:
means for transmitting a dissociation message, a deauthentication message, or a BSS transition management frame to the first client device.

29. The apparatus of claim 17, further comprising:
means for terminating the second BSS based on a change in status of the first client device.

30. The apparatus of claim 29, wherein the change in status comprises at least one of a change in association between the first client device and the first BSS or the second BSS, or a change in the determination that the first client device is monopolizing the channel of the first BSS, or a change in association between a second client device and the first BSS, or a combination thereof.

31. The apparatus of claim 17, further comprising:
means for steering the first client device to the first BSS based on a termination of the second BSS, or a change in the determination that the first client device is monopolizing the channel of the first BSS, or a change in association between a second client device and the first BSS, or a combination thereof.

32. The apparatus of claim 17, wherein a service set identifier (SSID) and security credentials of the first BSS and the second BSS are the same.

33. An apparatus for wireless communication, in a system comprising:
a processor;
memory in electronic communication with the processor; and
instructions stored in the memory and operable, when executed by the processor, to cause the apparatus to:
determine that a first client device is monopolizing a channel of a first basic service set (BSS) associated with a first BSS identifier (BSSID);
dynamically create, based on the determining, a second BSS comprising a virtual AP, wherein the second BSS is throttled with respect to the first BSS; and
steer the first client device to the second BSS, the second BSS associated with a second BSSID different from the first BSSID.

34. The apparatus of claim 33, wherein the instructions are further executable by the processor to:
determine a performance degradation of a second client device connected to the first BSS.

35. The apparatus of claim 34, wherein the instructions are further executable by the processor to:
determine an airtime usage of the channel by the first client device.

36. The apparatus of claim 33, wherein the instructions are further executable by the processor to:
increase an enhanced distributed channel access (EDCA) deferral length for the first client device.

37. The apparatus of claim 33, wherein the instructions are further executable by the processor to:
reduce a transmission opportunity (TXOP) limit for the first client device.

38. The apparatus of claim 33, wherein the instructions are further executable by the processor to:
selectively withhold a transmission of a clear to send (CTS) message to the first client device.

39. The apparatus of claim 33, wherein the instructions are further executable by the processor to:
receive a request to send (RTS) message from the first client device, the RTS message comprising a requested duration value;
select a duration field value that is less than the requested duration value, the selecting based on the determination; and
transmit a clear to send (CTS) message to the first client device, the CTS message comprising the selected duration field value.

40. The apparatus of claim 33, wherein the instructions are further executable by the processor to:
modify an uplink Aggregate MAC Protocol Data Unit (A-MPDU) policy for the first client device.

41. The apparatus of claim 33, wherein the instructions are further executable by the processor to:
prevent the first client device from reassociating with the first BSS after steering the first client device to the second BSS.

42. The apparatus of claim 33, wherein the instructions are further executable by the processor to:
drop an uplink packet from the first client device at a protocol layer higher than a media access control (MAC) protocol layer.

43. The apparatus of claim 33, wherein the instructions are further executable by the processor to:
determine that the first client device is overloading an uplink channel associated with the first BSS.

44. The apparatus of claim 33, wherein the instructions are further executable by the processor to:
transmit a dissociation message, a deauthentication message, or a BSS transition management frame to the first client device.

45. The apparatus of claim 33, wherein the instructions are further executable by the processor to:
terminate the second BSS based on a change in status of the first client device.

46. The apparatus of claim 45, wherein the change in status comprises at least one of a change in association between the first client device and the first BSS or the second BSS, or a change in the determination that the first client device is monopolizing the channel of the first BSS, or a change in association between a second client device and the first BSS, or a combination thereof.

47. The apparatus of claim 33, wherein the instructions are further executable by the processor to:
steer the first client device to the first BSS based on a termination of the second BSS, or a change in the determination that the first client device is monopolizing the channel of the first BSS, or a change in association between a second client device and the first BSS, or a combination thereof.

48. The apparatus of claim 33, wherein a service set identifier (SSID) and security credentials of the first BSS and the second BSS are the same.

49. A non-transitory computer readable medium storing code for wireless communication, the code comprising instructions executable by a processor to:
determine that a first client device is monopolizing a channel of a first basic service set (BSS) associated with a first BSS identifier (BSSID);
dynamically create, based on the determining, a second BSS comprising a virtual AP, wherein the second BSS is throttled with respect to the first BSS; and
steer the first client device to a second BSS, the second BSS associated with a second BSSID different from the first BSSID.

50. The non-transitory computer-readable medium of claim 49, wherein the instructions are further executable by the processor to:
determine a performance degradation of a second client device connected to the first BSS.

51. The non-transitory computer-readable medium of claim 50, wherein the instructions are further executable by the processor to:
determine an airtime usage of the channel by the first client device.

52. The non-transitory computer-readable medium of claim 49, wherein the instructions are further executable by the processor to:
increase an enhanced distributed channel access (EDCA) deferral length for the first client device.

53. The non-transitory computer-readable medium of claim 49, wherein the instructions are further executable by the processor to:
reduce a transmission opportunity (TXOP) limit for the first client device.

54. The non-transitory computer-readable medium of claim 49, wherein the instructions are further executable by the processor to:
selectively withhold a transmission of a clear to send (CTS) message to the first client device.

55. The non-transitory computer-readable medium of claim 49, wherein the instructions are further executable by the processor to:
  receive a request to send (RTS) message from the first client device, the RTS message comprising a requested duration value;
  select a duration field value that is less than the requested duration value, the selecting based on the determination; and
  transmit a clear to send (CTS) message to the first client device, the CTS message comprising the selected duration field value.

56. The non-transitory computer-readable medium of claim 49, wherein the instructions are further executable by the processor to:
  modify an uplink Aggregate MAC Protocol Data Unit (A-MPDU) policy for the first client device.

57. The non-transitory computer-readable medium of claim 49, wherein the instructions are further executable by the processor to:
  prevent the first client device from reassociating with the first BSS after steering the first client device to the second BSS.

58. The non-transitory computer-readable medium of claim 49, wherein the instructions are further executable by the processor to:
  drop an uplink packet from the first client device at a protocol layer higher than a media access control (MAC) protocol layer.

59. The non-transitory computer-readable medium of claim 49, wherein the instructions are further executable by the processor to:
  determine that the first client device is overloading an uplink channel associated with the first BSS.

60. The non-transitory computer-readable medium of claim 49, wherein the instructions are further executable by the processor to:
  transmit a dissociation message, a deauthentication message, or a BSS transition management frame to the first client device.

61. The non-transitory computer-readable medium of claim 49, wherein the instructions are further executable by the processor to:
  terminate the second BSS based on a change in status of the first client device.

62. The non-transitory computer-readable medium of claim 61, wherein the change in status comprises at least one of a change in association between the first client device and the first BSS or the second BSS, or a change in the determination that the first client device is monopolizing the channel of the first BSS, or a change in association between a second client device and the first BSS, or a combination thereof.

63. The non-transitory computer-readable medium of claim 49, wherein the instructions are further executable by the processor to:
  steer the first client device to the first BSS based on a termination of the second BSS, or a change in the determination that the first client device is monopolizing the channel of the first BSS, or a change in association between a second client device and the first BSS, or a combination thereof.

64. The non-transitory computer-readable medium of claim 49, wherein a service set identifier (SSID) and security credentials of the first BSS and the second BSS are the same.

* * * * *